US009730106B2

United States Patent
Lindoff et al.

(10) Patent No.: US 9,730,106 B2
(45) Date of Patent: Aug. 8, 2017

(54) TECHNIQUE FOR LOAD BALANCING BETWEEN CELLULAR NETWORK SUBSCRIPTIONS IN A ROUTER HAVING BOTH SHORT RANGE AND CELLULAR COMMUNICATION INTERFACES

(75) Inventors: Bengt Lindoff, Bjärred (SE); Harald Gustafsson, Lund (SE); Per Persson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 74 days.

(21) Appl. No.: 14/415,503

(22) PCT Filed: Jul. 19, 2012

(86) PCT No.: PCT/EP2012/003041
§ 371 (c)(1),
(2), (4) Date: Jan. 16, 2015

(87) PCT Pub. No.: WO2014/012561
PCT Pub. Date: Jan. 23, 2014

(65) Prior Publication Data
US 2015/0208279 A1    Jul. 23, 2015

(51) Int. Cl.
*H04L 12/26* (2006.01)
*H04W 28/08* (2009.01)
(Continued)

(52) U.S. Cl.
CPC ........... *H04W 28/08* (2013.01); *H04W 88/06* (2013.01); *H04W 8/183* (2013.01); *H04W 84/12* (2013.01); *H04W 88/16* (2013.01)

(58) Field of Classification Search
CPC ......... H04L 47/30; H04L 47/32; H04L 47/35; H04W 8/20; H04W 8/205; H04W 88/16; H04W 88/06; H04W 28/08
See application file for complete search history.

(56) References Cited

U.S. PATENT DOCUMENTS 7,489,947 B2    2/2009  Castrogiovanni et al.
2005/0088999 A1*  4/2005  Waylett ................. H04W 88/10
                                         370/338
(Continued)

FOREIGN PATENT DOCUMENTS

EP          1 606 964 A1    12/2005
WO    WO-2010140781 A2    12/2010

OTHER PUBLICATIONS

PCT International Search Report and Written Opinion for PCT/EP2012/003041, mailed Apr. 18, 2013, 17 pages.

*Primary Examiner* — Ian N Moore
*Assistant Examiner* — Phong La
(74) *Attorney, Agent, or Firm* — Nicholson De Vos Webster & Elliott LLP (57) ABSTRACT

A WLAN router connected via a cellular network (e.g. LTE) to the Internet is disclosed; a plurality of SIMs (subscriptions), each associated with a user of the router, may be plugged into the router (or soft SIMs used); simultaneous Internet access for a plurality of users is achieved, even if the WLAN router does only have one TX/RX equipment, by the following features: the WLAN router—when receiving a portion of network traffic for a user—determines the subscription that the portion is associated with and updates a data usage quota for the subscription accordingly by an amount of data corresponding to said portion; thereafter, it is decided whether future network traffic for that subscription shall be transmitted over the same network connection or another subscription's network connection based on the updated data usage quota; thus, the router carries out load balancing between the subscriptions.

22 Claims, 5 Drawing Sheets

(51) Int. Cl.
*H04W 88/06* (2009.01)
*H04W 8/18* (2009.01)
*H04W 88/16* (2009.01)
*H04W 84/12* (2009.01)

(56) References Cited

U.S. PATENT DOCUMENTS

| | | | |
|---|---|---|---|
| 2006/0239196 A1* | 10/2006 | Khanna | H04L 67/1002 370/235 |
| 2008/0259841 A1 | 10/2008 | Deshpande | |
| 2010/0027534 A1 | 2/2010 | Wu et al. | |
| 2010/0110890 A1* | 5/2010 | Rainer | H04M 15/00 370/232 |
| 2011/0003590 A1* | 1/2011 | Yoon | H04W 36/385 455/432.1 |
| 2011/0116444 A1 | 5/2011 | Relyea | |
| 2011/0117963 A1* | 5/2011 | Wang | H04W 48/18 455/558 |
| 2011/0199905 A1* | 8/2011 | Pinheiro | H04W 4/005 370/235 |
| 2011/0269423 A1* | 11/2011 | Schell | H04L 63/062 455/411 |
| 2011/0306318 A1* | 12/2011 | Rodgers | H04W 8/183 455/410 |
| 2012/0108200 A1* | 5/2012 | Rubin | H04L 47/14 455/405 |
| 2012/0158829 A1* | 6/2012 | Ahmavaara | H04L 63/101 709/203 |
| 2012/0230191 A1* | 9/2012 | Fang | H04W 36/22 370/235 |
| 2012/0327912 A1* | 12/2012 | Kirveskoski | H04W 76/025 370/336 |
| 2013/0005394 A1* | 1/2013 | Geary | H04W 52/028 455/552.1 |
| 2013/0065644 A1* | 3/2013 | Bishop | H04W 8/183 455/558 |
| 2013/0150032 A1* | 6/2013 | Pattaswamy | H04W 52/0229 455/434 |
| 2013/0156081 A1* | 6/2013 | Tat | H04W 88/06 375/222 |
| 2013/0196621 A1* | 8/2013 | Guday | H04W 24/02 455/406 |
| 2013/0225123 A1* | 8/2013 | Adjakple | G06Q 20/322 455/406 |
| 2013/0290537 A1* | 10/2013 | Shaw | H04L 67/101 709/226 |
| 2013/0303203 A1* | 11/2013 | Wang | H04W 68/00 455/458 |
| 2013/0303240 A1* | 11/2013 | Sanka | H04B 1/3816 455/558 |
| 2014/0057593 A1* | 2/2014 | Cloutier | H04W 12/08 455/405 |
| 2014/0219242 A1* | 8/2014 | Perras | H04W 8/082 370/331 |

* cited by examiner

TECHNIQUE FOR LOAD BALANCING BETWEEN CELLULAR NETWORK SUBSCRIPTIONS IN A ROUTER HAVING BOTH SHORT RANGE AND CELLULAR COMMUNICATION INTERFACES

CROSS-REFERENCE TO RELATED APPLICATIONS

This application is a National stage of International Application No. PCT/EP2012/003041, filed Jul. 19, 2012, which is hereby incorporated by reference.

TECHNICAL FIELD

The present disclosure generally relates to load balancing between at least two subscriptions in a routing apparatus. Specifically, load balancing between at least two subscriptions in a routing apparatus, wherein each subscription is associated with a dedicated connection, and wherein each subscription is associated with a certain data usage quota.

BACKGROUND

The number of Internet connections using mobile broadband continues to rise. With the introduction of flat rate—i.e. fixed price for an (almost) free data amount (or at least reasonable large, around 20 GB/month)—in combination with high performance modems for 3GPP High Speed Packet access (HSPA or HS) or 3GPP Long Term Evolution (LTE) cellular systems, many users actually skip fixed line subscriptions, such as Asynchronous Digital Subscriber Lines (ADSLs), and only rely e.g. on a Mobile Broadband (MBB) connection.

Recently, there have been a number of $3^{rd}$ Generation (3G) and $4^{th}$ Generation (4G) routers out on the market, where the user uses a subscription—e.g. by plugging in a Subscriber Identity Module (e.g. SIM) into the router, or into a modem assigned to the router (e.g. via Universal Serial Bus, USB)—and then via a short range communication system (such as Wireless Local Area Network, WLAN) included in the router, the entire household of the user may be connected to the Internet.

In many applications, it is to be expected that more than one device is connected e.g. to a gateway/router using e.g. short range communication (such as WLAN or Bluetooth®), and that in turn, the gateway/router is connected to the Internet e.g. via a cellular system connection, such as LTE, Wideband Code Division Multiple Access-High Speed (WCDMA-HS) or Enhanced General Packet Radio Service (EGPRS). One example may be Machine-to-Machine (M2M) applications, for instance sensors, performing a measurement and sending a report on the measurement e.g. to the router. Further, the sensors may feed the information e.g. via a network connection to a data base.

Another example could be MBB users in a house with several apartments. Each apartment (which may constitute a user) may be connected to such a (cellular) router (e.g. a high end LTE-advanced modem). Instead of all users having their own (low-end) router (or modem), they share one high-end modem for high speed connection to Internet. Such a router (or modem) could be placed on an optimized position in order to exploit the best available radio channel conditions.

In the above-mentioned use-cases, the different users (or their respective devices) may have different network subscriptions (implemented e.g. by a Subscriber Identity module, SIM), typically placed in respective users smart phone, but via for instance a so-called soft SIM (involving a so-called Bluetooth® SIM connect CHECK message), the high-end modem may be used (and then, for example, 1 Gbit/s instead of 10 Mb/s as may be possible in the smart phone alone, can be achieved).

Problems with Existing Solutions not Realized by the Prior Art

There has been proposed a mobile phone with dual-SIM capability and a single baseband (for instance, a single transceiver, TRX). In such a solution, only one subscription (or SIM) could be the active at a time, i.e. in case there is one incoming call to one subscription, the other subscription is detached from the network and the speech service is enabled for the first subscription.

However, such a voice centric approach does not support MBB scenarios, where several users/devices with different MBB subscription may simultaneously need connection to the Internet, i.e. as in the examples described above. One naïve approach would be to have separate network modems, or a router having dual (or multiple) SIMs and dual (or multiple) transceivers. This will typically add cost and complexity to such a router (which would have to support n subscriptions implying n transceivers).

SUMMARY

Accordingly, there is a need for an implementation of a scheme that avoids one or more of the problems discussed above, or other problems. In particular, in one embodiment, there is a need for low cost single transceiver routers/devices capable to handle simultaneously MBB traffic for multiple subscriptions.

In other words, the present invention solves, for example, the problem of how to balance the data usage between different subscriptions (e.g. SIMs) in a multi-SIM router without any need for dual (or multi) transceivers. In the above-described scenarios, it would be fair to pay for the MBB connection in relation to the corresponding amount of data used. In order to be able to solve this issue, as said, a router capable of managing multiple subscriptions (e.g. SIMs) is needed.

In a first aspect, there is provided a method for load balancing between at least two subscriptions in a routing apparatus, wherein each subscription is associated with a dedicated connection, wherein each subscription is associated with a certain data usage quota, and wherein the method is performed in the routing apparatus and comprises the steps of receiving a portion of network traffic attributable to one of the at least two subscriptions over a first dedicated connection associated with a first subscription; determining the one subscription the portion of network traffic is associated with; updating the data usage quota of the determined subscription by an amount of data corresponding to the portion of network traffic; and deciding, based on the updated data usage quota of the determined subscription, continuing usage of the first dedicated connection associated with the first subscription for subsequent network traffic associated with the determined subscription or enabling a second dedicated connection associated with at least one other subscription different from the first subscription for subsequent network traffic associated with the determined subscription.

In a first refinement of the first aspect, the enabling step may further comprise disabling the first dedicated connection of the determined subscription. In this way, resources are efficiently used.

In a second refinement, the portion of network traffic may be one of a data packet, a burst of data packets and a data frame. If so, each subscription may be associated with an Internet Protocol, IP, address, and the determining step may be performed based on an IP address of the data packet. Moreover, the association between each subscription and the IP address may be performed by an interface on which an external communication device is associated with a particular subscription. In this way, the present invention is implemented efficiently, using available system resources as far as possible.

In a third refinement, a pre-association between each subscription and a dedicated access key may be defined, and the association between each subscription and the IP address may be performed when an external communication device authenticates with one of the access keys. Also in this way, the present invention is implemented efficiently, using available system resources as far as possible.

In a fourth refinement, the determining and updating steps may be performed for portions of network traffic on an Uplink, UL, of the first dedicated connection, a Downlink, DL, of the first dedicated connection, or both of the UL and DL of the first dedicated connection. If so, in the UL case, the first dedicated connection may be a fixed line; in the DL case, the first dedicated connection may be a cellular network connection; or in case of both UL and DL, the first dedicated connection may be a short range wireless connection (such as WLAN).

In a fifth refinement, the deciding step may comprise load balancing the total amount of network traffic transported by means of the determined subscription proportional to the amount of network traffic actually associated with the determined subscription over a predetermined time period. If so, the predetermined time period may be a fixed periodic time interval; alternatively, the predetermined time period may be event-based. Moreover, in the fifth refinement, the enabled subscription may be selected according to which subscription owes the highest amount of data to the determined subscription. Alternatively, the enabled subscription may be pre-selected for offload, and another enabled subscription may be selected according to which subscription owes more amount of data to the determined subscription than the currently pre-selected enabled subscription. As still another alternative, the enabled subscription may be pre-selected from a list of candidate enabled subscriptions, and another enabled subscription may be selected from the list according to which subscription owes more amount of data to the determined subscription than the currently pre-selected enabled subscription. In this way, it is ascertained that the switching between the subscription is performed in a "fair" way, meaning that substantially all subscription allow the basically the same amount of "foreign" network traffic.

In a sixth refinement, the enabling step may involve a connection release procedure for the connection of the determined subscription. In addition or alternatively, the enabling step may involve a connection setup procedure for the connection of the enabled subscription. In this way, the present invention may be practised more efficiently by exploiting reusability of existing standard measures (here: connection release/setup) as far as possible.

In a seventh refinement, the method may further comprise, in response to the enabling step, transmitting subsequent portions of network traffic associated with the determined subscription over the first dedicated connection of the enabled subscription.

In a second aspect, there is provided a computer program product comprising program code portions for performing the method of the first aspects (and its refinements) when the computer program product is executed on one or more computing devices. Moreover, the computer program product may be stored on a computer readable recording medium.

It is to be noted that a network entity (or several entities) may implement any of the technical details set forth for the method aspects herein, and thus achieves the same advantages. In other words, the network entity (or entities) may comprise components adapted to perform any of the method steps disclosed herein. There is also provided, in a third aspect, a routing apparatus comprising one or more of such entities.

In a first refinement of the third aspect, the apparatus further comprises means for accommodating at least two Subscriber Identity Module, SIM, cards. Alternatively, there may be accommodated at least two soft Subscriber Identity Modules, SIMs. As another alternative, there may be accommodated at least one virtual Subscriber Identity Modules, SIMs. In the latter case, a (e.g. physical) SIM may be accommodated in the apparatus and may constitute the virtual SIM for an external communication device which is associated with the SIM.

BRIEF DESCRIPTION OF THE DRAWINGS

The embodiments of the technique presented herein are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, the embodiments will primarily be described in the context of a HS/LTE-type communication system; however, this does not rule out the use of the present technique in other communication systems.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Moreover, concerning the terms "router" or "routing apparatus" as used for the purpose of this description, for instance, an entity may be referred to, in which e.g. the modem part of a combined router and modems (e.g. WLAN/cellular) device is altered, or which implements the "router" as described as an extension that is external to both the ordinary router and modem, as long as it is ascertained that subscriptions may be switched for the modem and measurements on the traffic to/from the modem. In addition or alternatively, if the router/modem apparatus has support for wireless subscriptions (or SIMs), the "router" as described may be implemented external to the router/modem by performing the measurements of network traffic externally (e.g. in the computers from operators or based on information from operators), and by instructing the modem to switch the subscription based on the decision to be described herein below. However, preferably, the "router" as described is provided inside the ordinary router/modem apparatus.

In addition, the present description shows the special case of "Dual-SIM". However, "Dual-SIM" is to be construed to "Multi-SIM", in the sense that the present disclosure also covers routers capable of handling triple, quadruple etc. subscription routers. Furthermore, the present disclosure covers physical SIM cards of any size, as well as soft-SIM solutions. The present disclosure also covers "virtual SIM" solutions, i.e. where the SIM is physically placed in an external unit, but via e.g. a wireless connection to the router, the route has access to the SIM (for instance, using Bluetooth® SIM access profile).

Without being restricted thereto, as an example, the present invention proposes a method and apparatus implemented e.g. in a single (e.g. LTE, HS) transceiver router capable of managing multiple subscriptions (e.g. SIMs), such that the amount of data delivered over a respective subscription network connection is in proportion to the total amount of data used by a user/device associated with the respective subscription over a specified time period.

In contrast to the prior art—the dual-SIM approach used e.g. for voice services—, a specific application data packet to/from a first user (e.g. having a first SIM subscription) not necessarily needs to be transmitted over a network connection for that subscription, as long as the total amount of data transmitted/received over a specific network connection using a first subscription is substantially equivalent to the total amount of data packets associated with a user of the first subscription (over a specified time period, such as an hour/day/week/month etc.). As an example, it may be assumed that a user of subscription (e.g. SIM #1) uses 60% of data, and another user uses another subscription (e.g. SIM #2) for 40% of data. At the end of the time period, 60% of data should be delivered over the (first) subscription's dedicated connection, and 40% should be delivered over the other subscription's dedicated connection. As will be described herein below in greater detail, a control unit implemented in the router may solve this problem.

Figure 1:
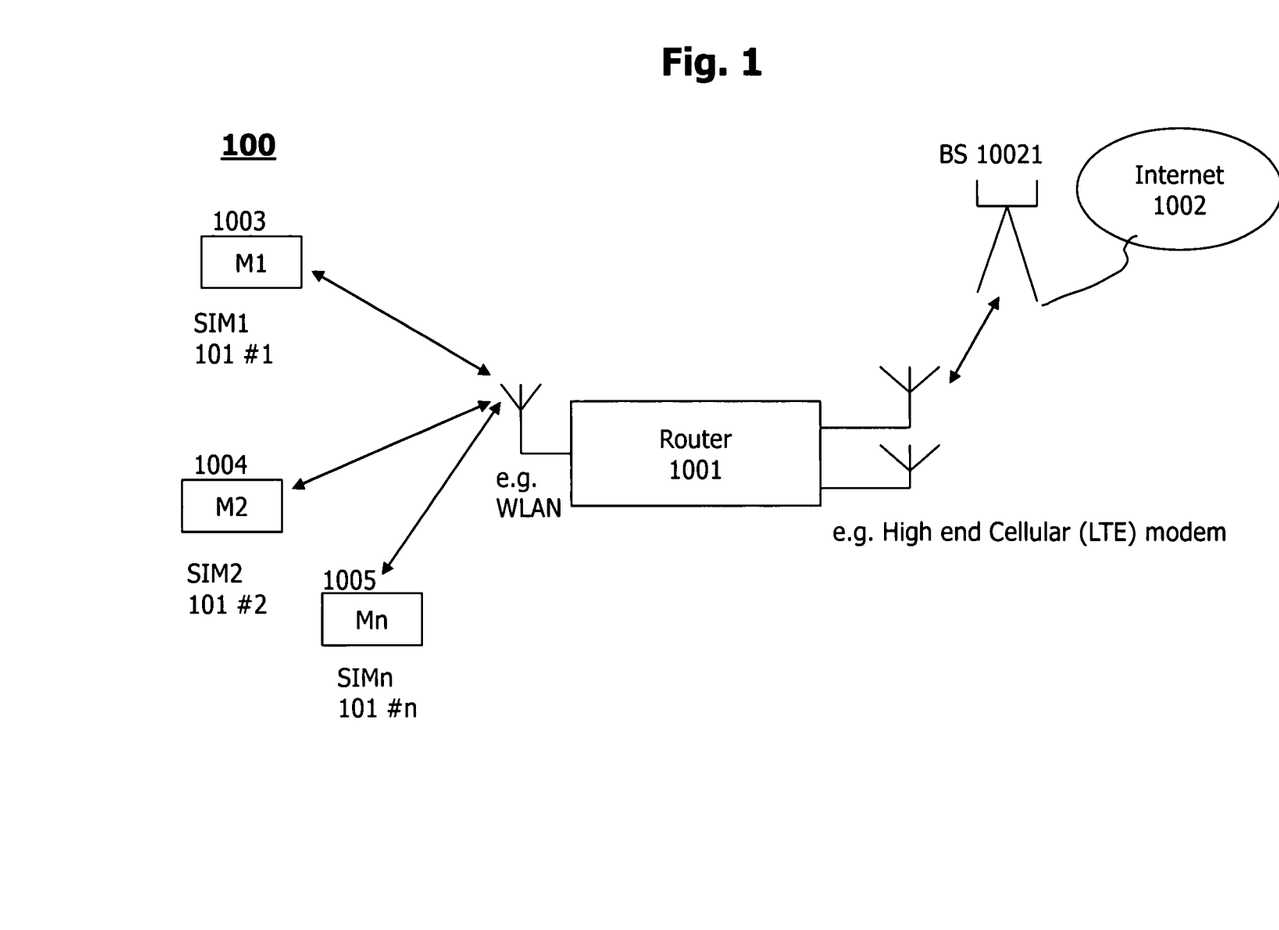
FIG. 1 shows a network system employing a first or second example of the exemplary device embodiment of the present invention.
Figure 1A:
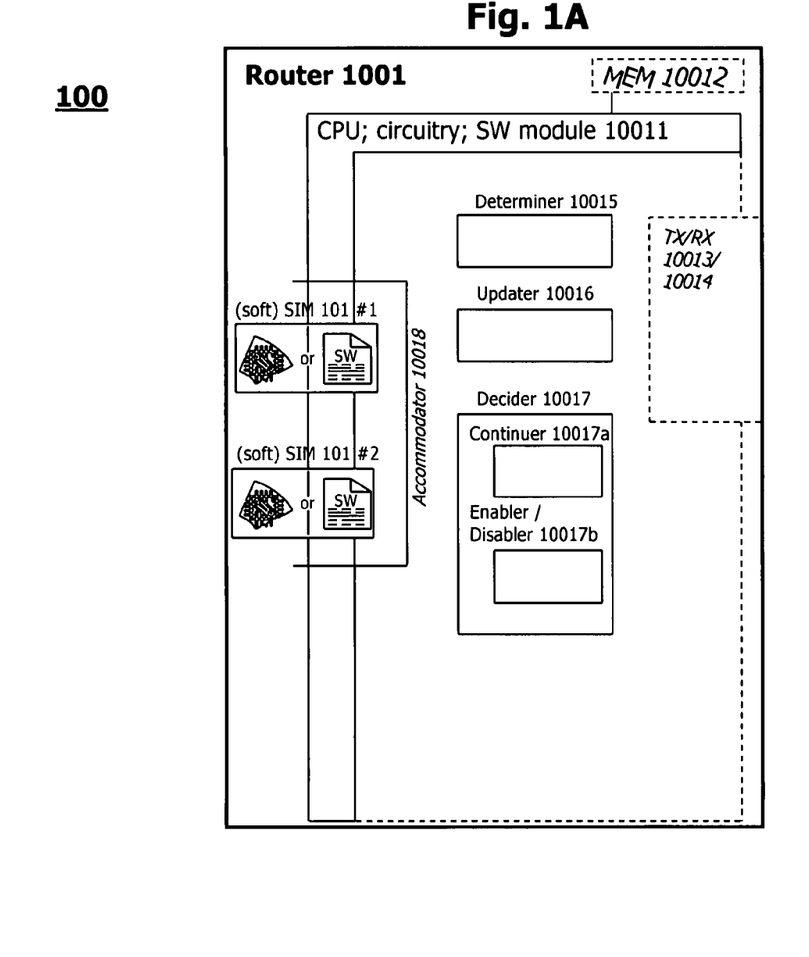
FIG. 1A shows components comprised in a first exemplary device embodiment realized in the form of router.
Figure 1B:
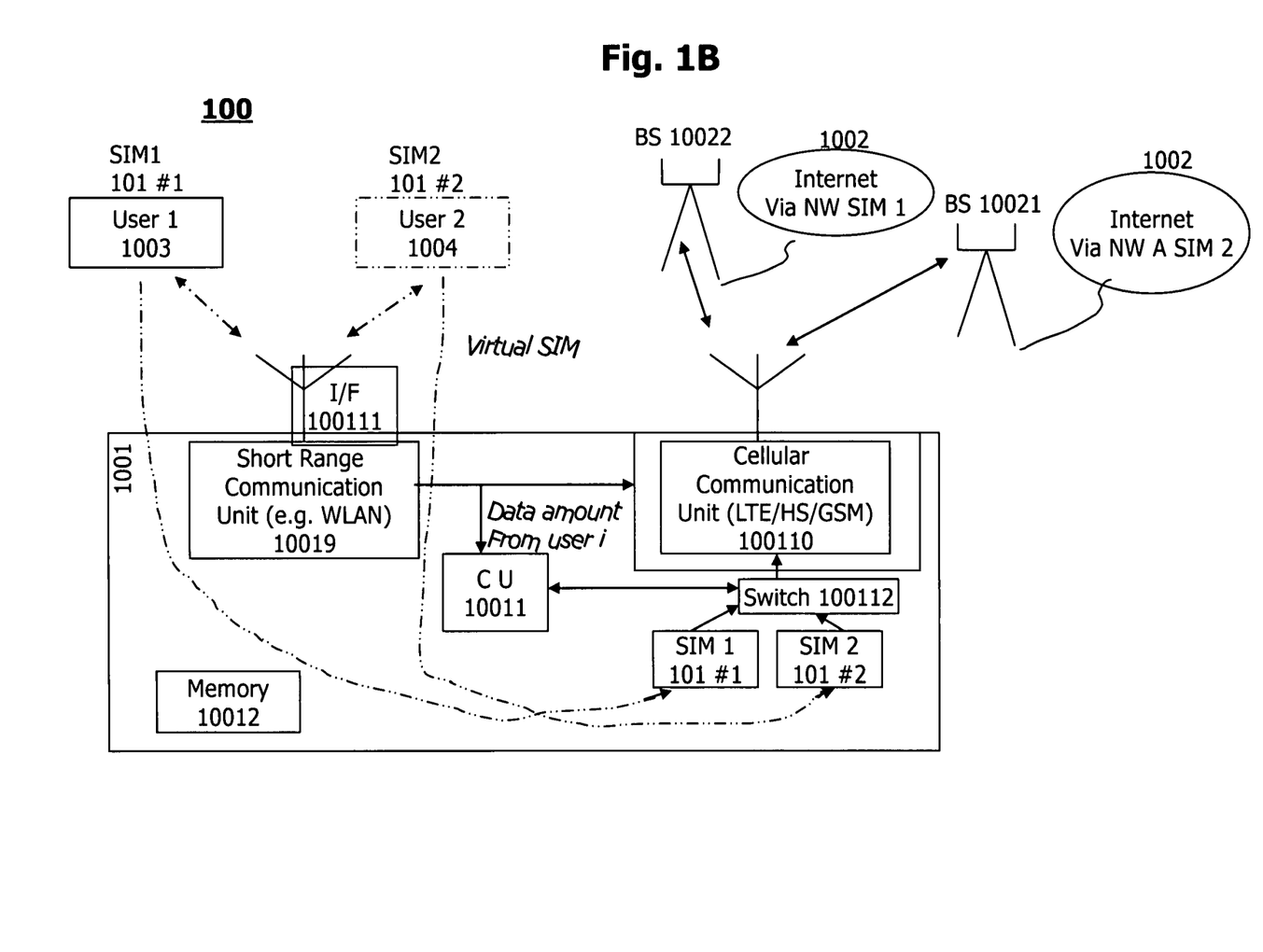
FIG. 1B shows a network system employing a second exemplary device embodiment realized in the form of router.

FIGS. 1, 1A and 1B show a general embodiment of the router 1001 as well as two examples of the routers 1001, wherein the first and second examples might supplement one another. As shown in FIGS. 1, 1A and 1B, the router 1001 comprises a core functionality (e.g., one or more of a central processing unit (CPU), dedicated circuitry and/or a software module) 10011, an optional memory (and/or database) 10012, an optional transmitter 10013 and an optional receiver 10014. Moreover, the router 1001 comprises a determiner 10015, an updater 10016, a decider 10017, a continuer 10017a, an enabler (or disabler) 10017b (the continuer 10017a and the enabler 10017b may be comprised in the decider 10017), an optional accommodator 10018 (for accommodating either physical or soft SIMs 101), a short range communication unit (e.g. WLAN) 10019, a cellular communication unit (that may support at least one of the following cellular systems LTE, HS and/or GSM) 100110, an interface unit 100111, and a switching unit 100112.

As partly indicated by the dashed extensions of the functional block of the CPU 10011, the determiner 10015, the updater 10016, the decider 10017, the continuer 10017a, the enabler (or disabler) 10017b, the accommodator 10018, the short range communication unit 10019, the cellular communication unit 100110, the interface unit 100111, and the switching unit 100112 (of the Router 1001) as well as the memory 10012, the transmitter 10013 and the receiver 10014 may at least partially be functionalities running on the CPU 10012, or may alternatively be separate functional entities or means controlled by the CPU 10011 and supplying the same with information. For the router 1001, the transmitter and receiver components 10013, 10014 may be realized to comprise suitable interfaces and/or suitable signal generation and evaluation functions.

The CPU 10011 may be configured, for example, using software residing in the memory 10012, to process various data inputs and to control the functions of the memory 10012, the transmitter 10013 and the receiver 10013 (as well the determiner 10015, the updater 10016, the decider 10017, the continuer 10017a, the enabler (or disabler) 10017b, the accommodator 10018, the short range communication unit 10019, the cellular communication unit 100110, the interface unit 100111, and the switching unit 100112 (of the router 1001)). The memory 10012 may serve for storing program code for carrying out the methods according to the aspects disclosed herein, when executed by the CPU 10011.

It is to be noted that the transmitter 10013 and the receiver 10014 may be provided as an integral transceiver, as is indicated in FIG. 1A. It is further to be noted that the transmitters/receivers 10013, 10014 may be implemented as physical transmitters/receivers for transceiving via an air interface or a wired connection (e.g., between the Router 1001 and a base station 10021 when they are embodied as separate entities), as routing/forwarding entities/interfaces between network elements (e.g., between the Router 1001 and the base station 10021, 10021 when they are embodied as functionally adjacent entities), as functionalities for writing/reading information into/from a given memory area (e.g., between the Router 1001 and the base station 10021, 10021 when they are embodied as two (or more) logical units disposed on one physical unit) or as any suitable combination of the above. At least one of the above-described determiner 10015, updater 10016, decider 10017, continuer 10017a, enabler (or disabler) 10017b, accommodator 10018, short range communication unit 10019, cellular communication unit 100110, interface unit 100111, and switching unit 100112 (of the router 1001), or the respective functionalities, may also be implemented as a chipset, module or subassembly.

FIG. 1B shows a network system employing a first or second example of the exemplary device embodiment of the present invention. As shown in FIG. 1, as a non-limiting example, the router 1001 may be a multi-SIM router; the router 1001 may be connected to one or more users M1, M2, . . . , Mn (or their respective terminals) 1003, 1004, 1005. Still further, the router 1001 may be in communication with said base stations 10021, 10022, which base stations may in turn serve as an access point to the Internet 1002 (e.g. via the first or second subscriptions network). In this case, the router may have an internal modem (which may be constituted by the cellular communication unit 100110), and the accommodator 10018 serves for supporting (at least) two SIM cards 101. The router 1001 may further comprise the short range wireless communication unit 10019 (employing e.g. WLAN, Bluetooth® etc.), the switching unit 100112 for switching to the SIM to be used, and a control unit (or CPU) 10011 controlling e.g. the switch unit 100112 (note that the switch unit 100112 may be based on connection release and connection setup procedures). The control unit 10011 may utilize information from the connection and from the cellular communication unit 100110 for setting the (SIM) switching unit 100112.

FIG. 1B shows a network system employing a second example of the exemplary device embodiment of the present invention (supplementing the first example). As shown in FIG. 1B, as a non-limiting example, the router 1001 may be the dual-SIM router. Here, as said, the router 1001 may comprise the cellular communication unit 100110, supporting e.g., LTE WCDMA/HS or similar, the short range wireless communication unit 100 e.g. 19 (WLAN, Bluetooth® etc.) (or fixed connection), the switch unit 100112 switching which subscription (e.g. SIM) to use, and the control unit (or CPU) 10011 controlling the switching unit 100112. The SIMs 101 could either be placed physically in the router/device 1001 (e.g. by means of the accommodator 10018), or could be a virtual SIM, with the SIM information being transferred over a wireless link, as described above. The router 1001 may also have the memory (storage means) 10012 for storing data bases/tables according to description above; for instance, the memory 10012 may store the quota for each subscription.

Figure 2:
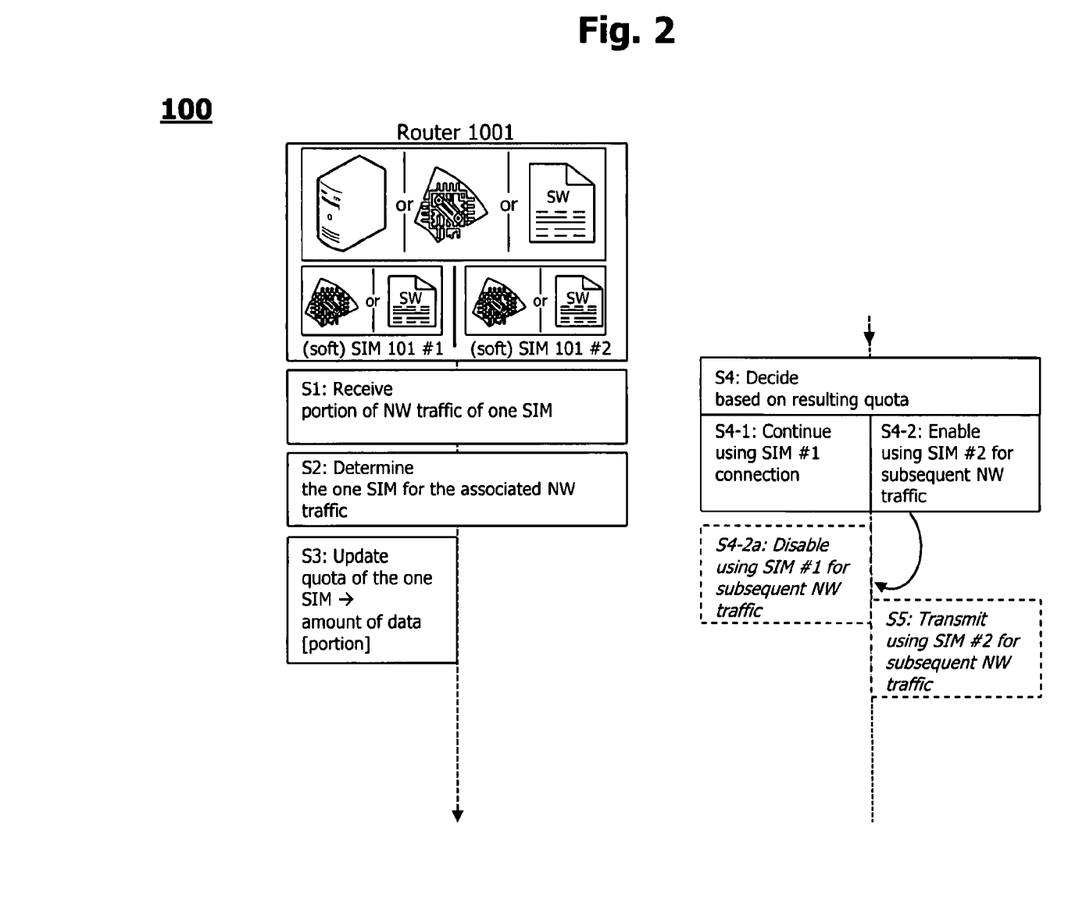
FIG. 2 shows a method embodiment which also reflects the interaction between the components of the device embodiment.

FIG. 2 illustrates an embodiment of a method for managing connection states of at least two subscriptions. In the signalling diagram of FIG. 2, time aspects between signalling are reflected in the vertical arrangement of the signalling sequence as well as in the sequence numbers. It is to be noted that the time aspects indicated in FIG. 2 do not necessarily restrict any one of the method steps shown to the step sequence outlined in FIG. 2. This applies in particular to method steps that are functionally disjunctive with each other. For instance, all steps S1 to S5 are shown to be timely substantially flowing; however, especially steps S4-2a (disabling) and S5 (transmitting) may or may not be carried out (directly) subsequently, timely overlapping, (substantially) concurrently, and also (substantially) simultaneously.

Referring still to the signalling diagram of FIG. 2 (to be read along with the router 1001 illustrated in FIGS. 1, 1A and 1B), each subscription 101 is associated with a dedicated connection, wherein each subscription is associated with a certain data usage quota. As shown in FIG. 1B, as a non-limiting example, the first subscription 101 #1 may involve physical SIM cards in both the router 1001 and the external unit 1003, whereas the second subscription 101 #2 may be a virtual SIM as described above.

In step S1, the receiver 10014 (possibly in conjunction with the short range communication unit 10019 and/or the interface unit 100111) of the router 1001 performs receiving a portion of network traffic (e.g. data packet (DP), DP burst or entire frame) attributable to one of the at least two subscriptions.

In step S2, the determiner 10015 (possibly in conjunction with the CPU/control unit 10011) performs determining the one subscription (e.g. SIM 101 #1) the portion of network traffic is associated with.

In step S3, the updater 10016 (possibly in conjunction with the CPU/control unit 10011) performs updating the data usage quota of the determined subscription by an amount of data corresponding to the portion of network traffic. For instance, if the portion of network traffic is a data packet, the size of the DP e.g. in bits may be deducted from or added to the quota of the determined subscription.

Lastly, in step S4, the decider 10017 (possibly in conjunction with the CPU/control unit 10011) performs deciding, based on the updated data usage quota of the determined subscription. On the one hand, in step S4-1, the continuer 10017a (possibly in conjunction with the CPU/control unit 10011) performs continuing usage of the dedicated connection of the determined subscription for subsequent network traffic associated with the determined subscription 101 #1; otherwise, the enabler 10017b (possibly in conjunction with the CPU/control unit 10011) performs enabling a dedicated connection associated with at least one other subscription 101 #2 different from the determined subscription for subsequent network traffic associated with the determined subscription.

In an optional step S4-2a, the disabler 10017b (possibly in conjunction with the CPU/control unit 10011) performs disabling the dedicated connection of the determined subscription.

Finally, in an optional step S5, the transmitter 10014 (possibly in conjunction with the CPU/control unit 10011, the short range communication unit 10019, the cellular communication unit 100110, and/or the interface unit 100111) performs transmitting subsequent portions of network traffic associated with the determined subscription over the dedicated connection of the enabled subscription.

Figure 2A:
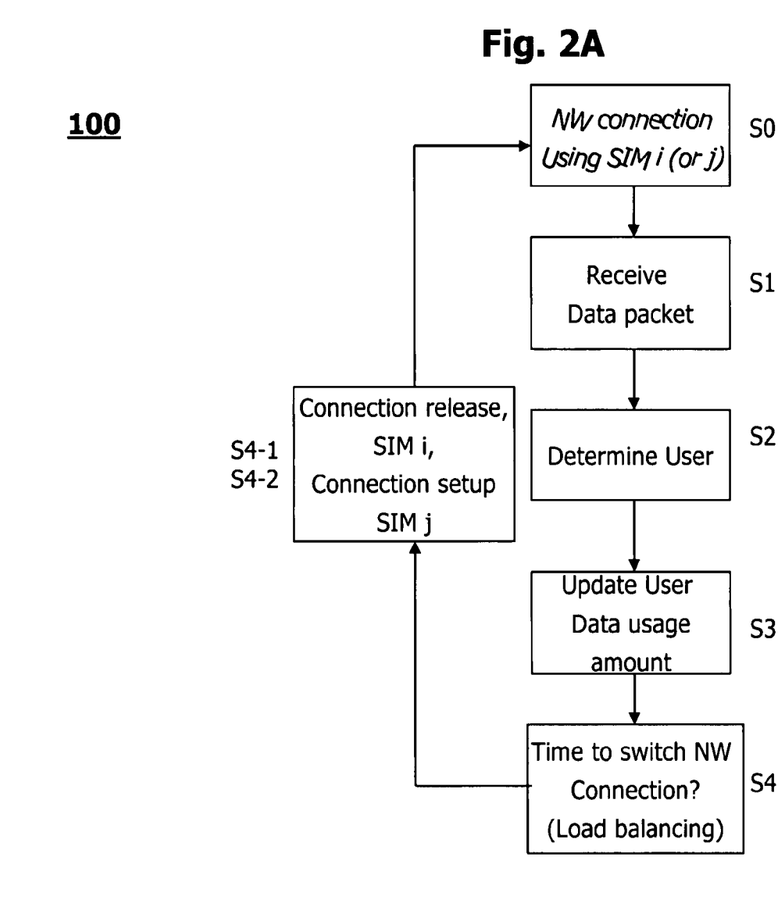
FIG. 2A shows a first exemplary embodiment of the method embodiment.

FIG. 2A shows a first exemplary embodiment of the method embodiment, to the details of which the present disclosure is not to be restricted to.

As said, the above-described router/device 1001 includes communication possibilities, e.g. wired or wireless (such as WLAN or Bluetooth®) to the external/remote devices 1003, 1004, using the different subscriptions (e.g. SIM) 101. Recall that the router 1001 may also include the Cellular (network) communication 100110 unit, capable of supporting (at least) data communication according to cellular protocols, such as EGPRS, WCDMA/HS or LTE. For example, via the switch unit 100112, the cellular communication unit 100110 is connected to a network node using subscription (e.g. SIM) i (thus embodying an optional preparatory step S0).

A data packet (as an example for the network traffic portion) is received, e.g. via the cellular communication unit 100110 or from one of the remote units 1003, 1004 connected to the router/device 1001 (thus embodying step S1).

The control unit/CPU 1001 (determiner 10015) determines the origin (or destination) of the packet in terms of which device the packet is sent from, or is delivered to (thus embodying step S2).

As an example, the origin (or destination) can be determined by identifying the packet's associated IP address. In turn, the IP address(es) of each device 1003, 1004 may be associated to one subscription (e.g. SIM) 101 (wherein the association process is described herein below in greater detail). The control unit 1001 (updater 10016) then updates e.g. a data base (such as a list/table or similar) including information of consumed data (one embodiment of the quota) for respective connected set of device(s) 1003, 1004 associated to a particular subscription (e.g. SIM i). The control unit 1001 (updater 10016) also updates the total amount (another embodiment of the quota) of data consumed over the network connection with the particular SIM i (thus embodying step S3).

In one example, only the DL data (e.g. from a network node via base stations 10021, 10022) is counted and stored (in the quota), in another example, only the UL data (to the network node) is counted and stored, and in yet another example, both UL and DL—concerning the quota—are updated and stored (for instance, in the same record or in separate records). Hence, it is achieved that a data packet associated with a first subscription (e.g. SIM) 101 #1 may be delivered (transmitted or received) over a network connection associated with a second SIM 101 #2. The control unit 10011 (decider 10017) may then, based on the amount of data each user has consumed and also the total amount of data the respective network connection with respective SIM has consumed (one or both of the amount and total amount embodying the quota), determine whether a switch (by means of the switch unit 100112) in the network detection is needed (thus embodying step S4).

The control unit 10011 may be considered to strive for allocating the same amount of consumed data from device(s) 1003, 1004 associated with a particular subscription 101 on this subscription over a given time period. Hence, the router 1001 is to balance the consumed data amount on a subscription 101 in proportion to the data originating from/designating for devices 1003, 1004 associated with that subscription (detailed description of such a scheme is described below). The time period, as a non-limiting example, may be not less than 10 to 30 minutes (but may also be in the order of hours, days, weeks or months) or, alternatively, can be event based when devices 1003, 1004 or subscriptions 100 connect or disconnect.

A subscription may be paid for on a per-day to a per-month basis, and hence, the balancing proposed may be made on a smaller time scale than the subscription payment period. The switching may be performed by a regular connection release and connection setup procedures, according to the respective cellular communication protocol, as described above. If the switching time is e.g. in the order of 100 ms to 2,000 ms, than the switching is not necessarily performed per data packet (which might have a negative effect on the throughput), but, as described above, is performed e.g. not more often than on a per-minute basis.

Alternatively or in addition, the switching may be performed when low data traffic is measured over the network connection, for instance during times at which the network connects to a lower communication state (for instance, LTE Radio Resource Connection, RRC_connected with a long discontinuous reception, DRX, or down-switch to idle state, or in WCDMA/HS when switching from Cell Dedicated Channel, Cell_DCH to Cell Forward Access Channel, Cell_FACH, or to Universal Mobile Telecommunications System Terrestrial Radio Access Network Registration Area Paging Channel, URA_PCH/idle.).

As described above, the balancing mechanism may be triggered by network events (idle), device/SIM events (attach/detach) or (periodic) time events or a combination thereof. In an example, one balance method may reside in selecting the subscription which owes the most amount of data to other subscriptions. This can be performed by completely sorting the above-described records e.g. based on SIM associated consumption subtracted with all transfers on that SIM. The most favourable result is selected (this approach is preferred since the complexity of parsing a complete sort is likely reasonable). Another alternative resides in selecting any first encountered subscription during search of the records that owes more than the current selected subscription. Yet another alternative resides in keeping a short list of candidate subscriptions of which the one that owes most is selected similarly as to the complete sort. Preferably, to get on the short list, a subscription that consumes above a certain threshold of amount of data during a time period is selected.

As described above, the association of an IP-address of a device 1003, 1004 and subscription SIM 101 can be established in several ways. For example, the router 1001 may have the interface unit 100111 on which the device 1003, 1004 connects and requests to be associated with a particular subscription 101. Such an interface unit 100111 may be realized e.g. over a local network and may use the Hyper Text Transfer Protocol (Secure) (HTTP(S)). Alternatively, the subscription/SIM 101 may be identified e.g. by the phone number and by authenticating (e.g. by supplying the Personal Identification Number, PIN, code). The IP-address could be supplied either explicitly or implicitly in the request; implicitly by the device 1003, 1004 using e.g. a certain IP address to communicate with the router 1001. Alternatively, the router 1001 may be configured to have several wireless Local Access Network (LAN) authentications, e.g. several Wi-Fi™ Protected Access (WPA) keys, each pre-associated with a SIM subscription 101. The device 1003, 1004 (IP-address) then authenticating using a particular WPA key may be associated with the subscription 101.

Advantages of the Invention

With the proposed invention, multiple users associated with different subscriptions (e.g. SIMs) may simultaneously use a multiple SIM, single TRX modem/router/device and at the same time, achieve a fair proportion (fair charge) of the data allocated on respective subscription (e.g. SIM).

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for load balancing between at least two subscriptions in a routing apparatus, the routing apparatus comprising a short range communication unit and a cellular communication unit, and wherein the method is performed in the routing apparatus and comprises:

receiving a portion of network traffic attributable to one of the at least two subscriptions over a first dedicated connection associated with a first subscription, wherein each one of the at least two subscriptions is associated with a Subscriber Identity Module (SIM) and a respective data usage quota, and wherein each subscription is associated with a dedicated connection;

determining that the first subscription is associated with the portion of network traffic;

updating the data usage quota of the determined subscription by an amount of data corresponding to the portion of network traffic; and     deciding, based on the updated data usage quota of the determined subscription, whether to continue usage of the first dedicated connection associated with the first subscription for subsequent network traffic associated with the determined subscription or to enable a second dedicated connection associated with at least one other subscription different from the first subscription for subsequent network traffic associated with the determined subscription.

2. The method of claim 1, wherein the enabling step further comprises disabling the first dedicated connection of the determined subscription.

3. The method of claim 1, wherein the portion of network traffic is one of a data packet, a burst of data packets and a data frame.

4. The method of claim 3, wherein each subscription is associated with an Internet Protocol (IP) address, and wherein the determining is performed based on an IP address of the data packet.

5. The method of claim 4, wherein the association between each subscription and the IP address is performed by an interface on which an external communication device is associated with a particular subscription.

6. The method of claim 4, wherein a pre-association between each subscription and a dedicated access key is defined, and the association between each subscription and the IP address is performed when an external communication device authenticates with one of the dedicated access keys.

7. The method of claim 1:
an Uplink (UL) of the first dedicated connection;
a Downlink (DL) of the first dedicated connection; or
both of the UL and DL of the first dedicated connection.

8. The method of claim 7, wherein:
in the UL case, the first dedicated connection is a fixed line;
in the DL case, the first dedicated connection is a cellular network connection; or
in case of both UL and DL, the first dedicated connection is a short range wireless connection.

9. The method of claim 1, wherein the deciding comprises load balancing the total amount of network traffic transported by means of the determined subscription proportional to the amount of network traffic actually associated with the determined subscription over a predetermined time period.

10. The method of claim 9, wherein the predetermined time period is a fixed periodic time interval.

11. The method of claim 9, wherein the predetermined time period is event-based.

12. The method of claim 9, wherein the determined subscription is selected according to which one of the at least two subscriptions owes the highest amount of data to the determined subscription.

13. The method of claim 9, wherein the enabled subscription is pre-selected for offload, and another enabled subscription is selected according to which subscription owes more amount of data to the determined subscription than the currently pre-selected enabled subscription.

14. The method of claim 9, wherein the enabled subscription is pre-selected from a list of candidate enabled subscriptions, and another enabled subscription is selected from the list according to which subscription owes more amount of data to the determined subscription than the currently pre-selected enabled subscription.

15. The method of claim 1, wherein the enabling involves a connection release procedure for the connection of the determined subscription.

16. The method of claim 1, wherein the enabling involves a connection setup procedure for the connection of the enabled subscription.

17. The method of claim 1, further comprising, in response to the enabling, transmitting the subsequent network traffic associated with the determined subscription over the first dedicated connection of the enabled subscription.

18. A routing apparatus for load balancing between at least two subscriptions in the routing apparatus, the routing apparatus comprising a short range communication unit and a cellular communication unit, the apparatus comprising:
a central processing unit (CPU) and a memory coupled to the CPU, wherein the memory contains a program code stored therein that causes the CPU to be operative to:
receive a portion of network traffic attributable to one of the at least two subscriptions over a first dedicated connection associated with a first subscription, wherein each one of the at least two subscriptions is associated with a Subscriber Identity Module (SIM) and a respective data usage quota, and wherein each subscription is associated with a dedicated connection;
determine that the first subscription is associated with the portion of network traffic;
update the data usage quota of the determined subscription by an amount of data corresponding to the portion of network traffic; and
decide, based on the updated data usage quota of the determined subscription, whether to continue usage of the first dedicated connection associated with the first subscription for subsequent network traffic associated with the determined subscription or to enable a second dedicated connection associated with at least one other subscription different from the first subscription for subsequent network traffic associated with the determined subscription.

19. The apparatus of claim 18, wherein the CPU is further operative to accommodate at least two Subscriber Identity Modules (SIM) cards.

20. The apparatus of claim 18, wherein the CPU is further operative to accommodate at least two soft Subscriber Identity Modules (SIMs).

21. The apparatus of claim 18, wherein the CPU is further operative to accommodate at least one virtual Subscriber Identity Module (SIM).

22. The apparatus of claim 21, wherein a SIM is accommodated in the apparatus and constitutes the virtual SIM for an external communication device which is associated with the SIM.

* * * * *